(12) United States Patent
Renk et al.

(10) Patent No.: US 7,251,985 B2
(45) Date of Patent: Aug. 7, 2007

(54) SAFETY MODULE AND MEASURING ARRANGEMENT WITH SAFETY MODULE

(75) Inventors: Peter Renk, Lörrach (DE); Gerold Klotz-Engmann, Maulburg (DE); Michael Hügel, Lörrach (DE)

(73) Assignee: Endress + Hauser Flowtec AG, Reinach (CH)

( * ) Notice: Subject to any disclaimer, the term of this patent is extended or adjusted under 35 U.S.C. 154(b) by 119 days.

(21) Appl. No.: 11/086,360

(22) Filed: Mar. 23, 2005

(65) Prior Publication Data

US 2005/0223781 A1    Oct. 13, 2005

Related U.S. Application Data

(60) Provisional application No. 60/560,616, filed on Apr. 9, 2004.

(30) Foreign Application Priority Data

Mar. 23, 2004    (DE)    ............... 10 2004 014 600

(51) Int. Cl.
*G01M 3/00*    (2006.01)
*G01D 11/24*    (2006.01)

(52) U.S. Cl. ..................... 73/46; 73/866.1
(58) Field of Classification Search ............ 73/46, 73/866.1
See application file for complete search history.

(56) References Cited

U.S. PATENT DOCUMENTS

| 4,958,938 A |   | 9/1990 | Schwartz |
| 5,150,614 A | * | 9/1992 | Urich ........................... 73/308 |
| 5,710,552 A | * | 1/1998 | McCoy et al. ......... 340/870.21 |

(Continued)

FOREIGN PATENT DOCUMENTS

DE    195 07 616 A1    9/1996

(Continued)

OTHER PUBLICATIONS

XIP001207445, ANSI/ISA-12/27/01—2003, "Requirements for Process Sealing Between Electrical Systems and Flammable or Combustible Process Fluids", pp. 1-15.

*Primary Examiner*—Daniel S. Larkin
(74) *Attorney, Agent, or Firm*—Bacon & Thomas, PLLC

(57) ABSTRACT

A measuring arrangement, including: a measuring transmitter with a sensor for registering a property of a medium and for issuing a primary signal dependent on the property; a transmitter housing, with at least one chamber and a first opening on the side facing the medium as well as a second opening, with a first contamination path section extending between the openings through the chamber; a first seal, which interrupts the first contamination path section; a circuit in the chamber, for processing the primary signal and producing an output signal, which is issued over a first signal path section through the second opening; a safety module, which includes: a module housing with at least one module chamber, having a first module opening on the side facing the transmitter and a second module opening, wherein a second contamination path section reaches from the first module opening at least as far as into the module chamber; at least a second seal, which interrupts the second contamination path section; and a second signal path section; wherein the safety module is connectable with the transmitter, such that the contamination path sections and signal path sections connect each to one another; and a leak detector, which monitors a contamination path section between the two seals.

11 Claims, 4 Drawing Sheets

U.S. PATENT DOCUMENTS 5,907,112 A    5/1999    Queyquep

FOREIGN PATENT DOCUMENTS

| | | |
|---|---|---|
| DE | 19747273 | 4/1999 |
| DE | 10124678 | 11/2002 |
| DE | 103 55 784 A1 | 3/2005 |
| EP | 1 507 133 A2 | 2/2005 |
| WO | WO 96/10730 | 4/1996 |

* cited by examiner

SAFETY MODULE AND MEASURING ARRANGEMENT WITH SAFETY MODULE

FIELD OF THE INVENTION

The present invention relates to a safety module, especially a safety module for measurement transmitters, as well as to a measuring arrangement having such a safety module.

BACKGROUND OF THE INVENTION

Measurement transmitters are frequently used to monitor a process parameter of a medium. Process parameters can be, for example, but not limited to, pressure, fill level, flow rate, pH, temperature. Measurement transmitters of this type have the following features:

a sensor for registering a parameter of a medium, with the sensor issuing a primary signal dependent on the parameter;

a transmitter housing, which defines at least one chamber in its interior, and which has a first opening on the side facing the medium, and a second opening; and an electronic circuit, which is arranged in the at least one chamber, with the circuit processing the primary signal of the sensor, and producing an output signal, which is issued over a signal path extending through the second opening.

Through the first opening on the side facing the medium, the sensor can register the parameter to be measured, provided that the sensor is arranged in the transmitter housing, or the primary signal can be conducted into the transmitter housing through the first opening on the side facing the medium, if the sensor is arranged outside of the transmitter housing. In the area of the first opening, a seal is normally provided, which protects the at least one chamber from penetration of the medium.

A failure of the seal could, however, open a contamination path reaching from the first opening to the second opening, and extending through the at least one chamber. From the second opening, the medium could then escape into the environment, or even into a control room or measurement room, if piping is provided for the rest of the signal path, for example a pipeline in the sense of a conduit system as specified in NEC 501-4. The American standard ANSI/ISA-12.27.01-2003 with the title "Requirements for Process Sealing Between Electrical Systems and Flammable and Combustible Process Fluids" takes this problem into account. This standard requires that first and second seals be provided, which interrupts the contamination path, and that, in addition, means be provided to monitor the contamination path between the first and second seals in order to indicate a failure of the first seal.

SUMMARY OF THE INVENTION

In new developments of measurement transmitters, this standard can be taken into account for the improvement of plant safety. This route, however, still fails in the case of the installed base of measurement transmitters or in the case of devices previously released for production.

An object of the present invention is to improve the safety of conventional measurement transmitters.

The object is achieved according to the invention by a measuring arrangement and a safety module.

The measuring arrangement of the invention includes: a measurement transmitter having; a sensor for registering a parameter of a medium, with the sensor issuing a primary signal dependent on the parameter; a transmitter housing, which defines at least one chamber in its interior, and which has a first opening on the side facing the medium and a second opening; with a first section of a contamination path reaching from the first opening to the second opening, and extending through the at least one chamber; a first seal, which interrupts the first section of the contamination path; an electronic circuit, which is arranged in the at least one chamber, with the circuit processing the primary signal of the sensor, and producing an output signal, which is issued over a first section of a signal path extending through the second opening; with a safety module, which includes a module housing, which defines at least one module-chamber in its interior, and which has a first module-opening on the side facing the transmitter and a second module-opening, with a second section of the contamination path reaching from the first module-opening at least as far as into the at least one module-chamber; at least one second seal, which interrupts the second section of the contamination path; and a second section of the signal path. The module housing is connectable with the transmitter housing, such that the second section of the contamination path connects to the first section of the contamination path; and the second section of the signal path is connectable to the first section of the signal path, in order to further conduct the output signal from the first section of the signal path. And a leak detector, which monitors a part of the contamination path arranged between first seal and the second seal.

The contamination path refers in general to a path over which a medium can spread, when not prevented by means of the aforementioned seals, and when necessary, additional seals. The term "seal" is to be broadly interpreted.

The first seal of the invention, located on the side facing the medium, can be any barrier in the contamination path, with the subsequent section of the contamination path, which is protected from the medium by means of the seal, being monitored by the leak detector. In this respect, the first seal can be a seal which, upon installation of the transmitter, is conventionally permanently exposed to the medium; such a seal can be arranged, for example, in the form of a ring or diaphragm, in the area of the first opening. On the other hand, the first seal on the side facing the medium, according to the invention, can also be a subsequently arranged seal, which first comes into contact with the medium when preliminary seals have failed. Such a seal can be, for example, the seal of an electrical bushing, which can occur in a partition or in a modularly constructed transmitter between two different modules. For example, a partition can be provided in the interior of the transmitter housing, so that the transmitter housing has a first chamber and a second chamber in its interior, with the first chamber serving, for example, as an electronics compartment, and the second chamber as a so-called connection compartment. In this case, the circuit for evaluating the primary signal is usually arranged in the electronics compartment, with the signal path being directed through the partition into the connection compartment by way of electrical bushings. The fasteners of the electrical bushings in the partition can, with appropriate detailing, serve as seals, blocking the contamination path between the electronics compartment and the connection compartment.

The signal path of the invention refers to the transmission route of signals between the transmitter and a transmission line conventionally connected to it. The signal path is defined in the interior of the transmitter at least in sections by a sequence of electrical circuits, cables, and electrical bushings. The contamination path extends at least in sections parallel to the signal path or alongside it, because the electrical bushings require openings in the housing, which must be sealed off. In the case of failure of the sealing measures, a medium can pass through the resulting openings.

The first seal is preferably dimensioned such that it passes the "Primary seal leakage test" in accordance with Section 6.3.1, and the "Primary seal burst pressure test" in accordance with Section 6.3.2, of the ANSI/ISA-12.27.01-2003.

The second seal is preferably dimensioned such that it passes the "Secondary seal leakage" test in accordance with Section 6.3.5 of the ANSI/ISA-12.27.01-2003. That is, the second seal should preferably withstand a test pressure corresponding to 1.5-times the venting pressure according to Section 6.3.3 of the ANSI/ISA-12.27.01-2003, which would arise when the safety module, the module housing, is connected, as in the invention, with the transmitter housing.

The prescribed test pressures depend on the maximum allowable operating pressures of the transmitter, and are more precisely specified in the aforementioned sections of the ANSI/ISA-12.27.01-2003.

The module housing preferably has a pressure-tight connection with the transmitter housing, with the first module-opening in communication with the second opening of the transmitter housing. Preferably the two openings align with one another. In a presently preferred embodiment, the transmitter housing and the module housing have mutually complementing threading in the area of these openings, so that the module housing can be connected with the transmitter housing by means of a screwed connection. The module housing can be, for example, of a metallic material, such as steel or aluminum, or a synthetic material. Presently, a steel housing is preferred.

The safety module preferably is constructed to be connection-neutral. That is, the second section of the signal path, which extends through the safety module, does not cause any change of the transmitted signal, as long as the leak detector does not signal a leak. At the end of the second section of the signal path, the safety module has connecting means for connecting to a transmission line. These means of connection are accessible through the second module opening and preferably correspond to the means of connection provided in the transmitter housing for connection of the transmission line and/or the supply line, if no safety module comes between them. That is, the application of the safety module of the invention preferably requires no adaptations with regard to the connections for data transmission. Data transmission and supply can be accomplished by means of any protocols in the field of process measurement, for example by regulating the feed current (4-20 mA), as specified in the Profibus-standard or the Foundation Fieldbus-standard.

Likewise, the safety module can be neutral with regard to the mechanical connections. That is, on its side facing the transmitter housing, it can have the mechanical connection components of the transmission line and/or the mechanical connection components of possibly present conduits, with which the transmission line and/or the conduits would be secured to the transmitter housing in the absence of the safety module, and on the side facing the control room, it can have the mechanical connection components of the transmitter housing, at which the transmission line and/or the conduits therefor are usually secured.

The leak detector preferably is constructed such that, upon the detection of a failure of the first seal, it fulfills the requirements of Section 6.3.4 of the ANSI/ISA-12.27.01-2003.

The leak detector can be any sensor that can register the penetration of a contaminating medium into the monitored section of the contamination path, or that can register some other effect of the failure of the first seal. Thus it can be, for example, a conductivity sensor, a capacitive sensor, a temperature sensor, a gas sensor, an electrochemical sensor, an amperometric sensor, a potentiometric sensor, a resonance-based sensor, a fill level sensor, a flow rate sensor, or a pressure sensor, respectively a pressure switch. The leak detectors can thus indicate, depending on measuring principle, either directly the penetrating medium due to a leak, or another effect occurring due to the leak, such as a change in pressure or temperature.

For certain measuring transmitters with limited energy supply, for example two-wire devices with a feed current from 4-20 mA, leak detectors with minimal power consumption are presently preferred. Especially preferred for these applications are leak detectors without any power consumption. This criterion is met, for example, by pressure switches.

A pressure switch can be arranged such that it interrupts or short-circuits the signal path or signal-output of a 4-20 mA two-wire device, this resulting in a signal-current of 0, respectively 22 mA. Both of these signal-currents are fundamentally suited to indicate an error report, and are fundamentally interpreted as such.

The switching point for the pressure switch is selected such that, in the process-pressure ranges approved for the safety module, it produces with certainty an error report upon the failure of the first seal, but prevents false error signals. The switching point should thus lie outside the fluctuation range of the normal environmental pressure at the installation site of the sensor, or, respectively, outside the fluctuation range of the pressure inside the transmitter housing due to fluctuations in temperature. A suitable switching point can, for example, lie at an absolute pressure of 1.3 bar, 1.5 bar, or 2 bar, and/or at a gage pressure relative to ambient pressure, of 0.3 bar, 0.5 bar, or 1.0 bar. In order to provide as few openings in the module housing as possible, absolute pressure switches and absolute pressure sensors are presently preferred as leak detectors, because these do not require a reference air canal. In the case of transmitter housings with ventilation openings, which communicate with the pressure switch, the switching point can lie substantially lower, for example at an absolute pressure of 1.2 bar, and/or at a gage pressure, relative to ambient pressure, of 0.1 or 0.2 bar.

Instead of a simple short-circuit-signal, or a simple interruption of the signal, the pressure switch can be arranged such that, when a pressure limit value is exceeded, the current supply to the transmitter is interrupted, and, instead, an alarm circuit is fed from the current supply, with the alarm circuit being arranged in the housing of the safety module, and an alarm signal being issued over the signal path. The alarm circuit can include, for example, an astable multivibrator having a switching frequency which alternates between two signal levels, with the period of the switching-operations being considerably lower than the time-scale of the typical changes of measured process parameters in the contemplated measuring operation. The switching frequency can vary, for example, between 10 Hz and 10 kHz. In this way, the safety module generates an error signal, which is distinguishable from the normal short-circuit signal or a zero-signal of the interrupted line, and thus indicates specifically that the failure of the first seal has occurred. At a suitable site, for example in a control room or a control stand, a detector is provided accordingly, which detects the alarm signal and triggers an alarm. Also, the described alarm circuit with the astable multivibrator consumes no power in normal measuring operation, such that it is suitable for application in a two-wire measuring transmitter.

Insofar as the contamination path in the safety module extends parallel to the signal path, and the second seal interrupts the contamination path, such that it is sealed hermetically, the safety module can also meet the requirements for application in areas where there is danger of explosion. For such applications of the safety module, it is required that no more switching elements are provided beyond the second seal, or that yet a further seal or flame penetration barrier is provided, in the case that switching elements are still provided beyond the second seal. In a further embodiment of the safety module for applications in which there is danger of explosion, this fulfills the requirements for a flame penetration barrier or ignition barrier in the sense of a conduit seal, thus the application of a subsequent ignition barrier in a signal path contained in a conduit is unnecessary. The same is true accordingly for possibly present, secondary switching elements arranged sectionally parallel to the signal path, whose secondary signal, in the context of avoiding the second seal, is to be fed to the signal path between the second seal and a superordinated unit; also in this case for use in areas where there is danger of explosion, a flame penetration barrier or a hermetic seal is provided between the secondary switching elements and the signal path between the second seal and a superordinated unit.

The safety module of the measuring arrangement described above is suited especially for retrofitting conventional transmitters. In this respect, the invention also provides a safety module for connection to a transmitter having a transmitter housing, with the transmitter including a signal-output for communicating measurement signals over a signal path leading through an opening in the housing, with the safety module including:

a module housing, which defines at least one module-chamber in its interior, and which has a first module-opening on the side facing the transmitter and a second module-opening;

at least one seal, which interrupts a contamination path through the module housing;

a section of the signal path, which is connected to the signal output of the transmitter, in order to conduct the measurement signal through the safety module, with the module housing being sealingly connectable with the transmitter housing such that the first module opening communicates with the opening in the transmitter housing, such that the contamination path through the module housing communicates with an interior space of the transmitter housing; and a leak detector, which monitors a section of the contamination path located on the side of the seal facing the transmitter.

In a presently preferred embodiment, the seal is pressure-tight, and has a pressure-tight and gas-tight electrical bushing.

With respect to the further development of the safety module as an independent product intended especially for use with the installed base of measuring transmitters, the explanations for the safety module of the above-described measuring arrangement apply analogously.

The above-described measuring arrangement with the safety module concerns especially the retrofitting of measuring transmitters. The basic idea of a pressure switch as leak detector, which in normal measuring operation of the transmitter uses no energy, is however also realized by means of a measuring transmitter with:

a sensor for registering a parameter of a medium, with the sensor issuing a primary signal dependent on the parameter;

a transmitter housing, which defines in its interior at least one chamber, and which has a first opening on the side facing the medium and a second opening, with a contamination path reaching from the first opening to the second opening, and extending through the at least one chamber;

a first seal in the transmitter housing, interrupting the contamination path;

a second seal in the transmitter housing subsequent to the first seal and interrupting the contamination path;

an electronic circuit, which is arranged in the at least one chamber between the first seal and the second seal, with the circuit processing the primary signal of the sensor, and producing an output signal, which is issued over a signal path extending through the second opening; and a leak detector, which monitors a section of the contamination path between the first seal and second seal, characterized in that the leak detector, in the case of a failure of the first seal, changes the signal level of the output signal of the electronic circuit.

The transmitter can especially be a two-wire measuring transmitter or a four-wire measuring transmitter, in which the signal path extends over the feed line, and in which the measurement is represented by means of a current (4-20 mA).

The changing of the signal level occurs especially directly, that is, by avoiding the electronic circuit. The leak detector can especially be a pressure switch, which interrupts or short-circuits the output signal, or impresses another alarm signal on the signal path.

BRIEF DESCRIPTION OF THE DRAWINGS

The invention will now be explained in greater detail on the basis of an example of an embodiment illustrated in the figures, which show as follows.

DESCRIPTION OF THE PREFERRED EMBODIMENTS

Figure 1:
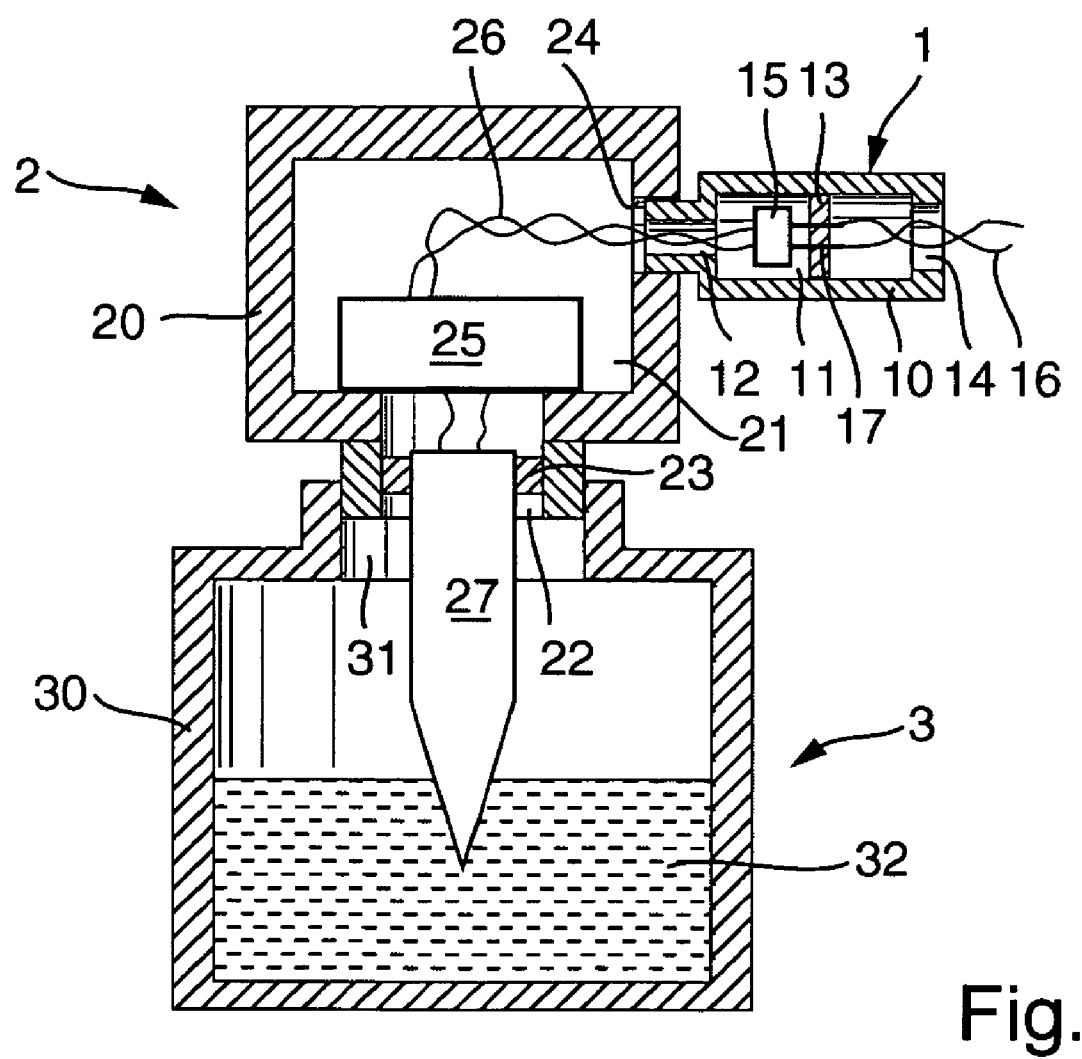
FIG. 1 a longitudinal section through a measuring arrangement of the invention.

The structure of the measuring arrangement according to the invention is explained on the basis of FIG. 1. The measuring arrangement includes a measuring transmitter for registering a process parameter, for example a temperature. The transmitter 2 has a housing 20, which defines in its interior at least one chamber 21, which is connected with the surroundings of the housing by means of a first opening 22 and a second opening 24. In the first opening 22, a temperature sensor 27 is arranged, which registers the temperature of a medium 32 in a container 30 of a process plant 3. In this connection, the transmitter 2 is installed in the container-opening 31 of the container.

Between the temperature sensor 27 and the cylindrical wall of the first opening 22 of the housing, a first seal 23 is arranged, which seals the chamber 21 against the penetration of the medium through the first opening 22. In this respect, a section of the contamination path from the container 30 of the process plant 3 into the chamber 21 of the transmitter 2 is interrupted by means of the first seal 23.

In the chamber 21 an electronic circuit 25 is arranged, which on the basis of a primary signal of the temperature sensor 27 generates an output signal, which represents the measured temperature value, for example, by regulating the feed current between 4 and 20 mA. The output signal is directed out of the housing 20 over a section of the signal path, which here includes a two-wire line 26.

In the case of state of the art measuring arrangements, the two-wire line could be led through a conduit into a control room. In the case of such an assembly, if only the first seal 23 fails, the possibly present medium can escape through the chamber 21 and the conduit as far as into the control room. This is avoided by means of the safety module 1. This module, first, interrupts the contamination path with a further seal, and, second, detects and signals the failure of the first seal. That is, upon the failure of the first seal 23, it is prevented that the medium can reach the second seal unnoticed, and, following failure of the second seal, ultimately enter into the control room.

The safety module 1 includes a module housing 10 which defines a module chamber 11, which is divided by means of a partition 13, in which electrical bushings 17 are arranged pressure-tightly. The partition 13, with the sealed bushings and the possibly present seals between the partition and the module housing, serves as the second seal of the invention. The partition, the bushings, and the module housing are preferably dimensioned such that they withstand the bursting pressure of the transmitter housing 20.

The signal path extends through the module housing 10, with the two-wire line being directed through a first module housing opening 12 from the transmitter 2 into the module housing 10, and being connected through the electrical bushings 17 with the feed line 16, which is directed through a second module-housing opening 14 into the module housing 10. In the module chamber 11 of the module housing 10, a pressure switch 15 is arranged, which short-circuits the two-wire line, when the pressure in the module chamber rises above a limit value. By means of the short circuit, the signal current exceeds the intended range for the transmission of measurements (4-20 mA) and thus signals an error.

Figure 2:
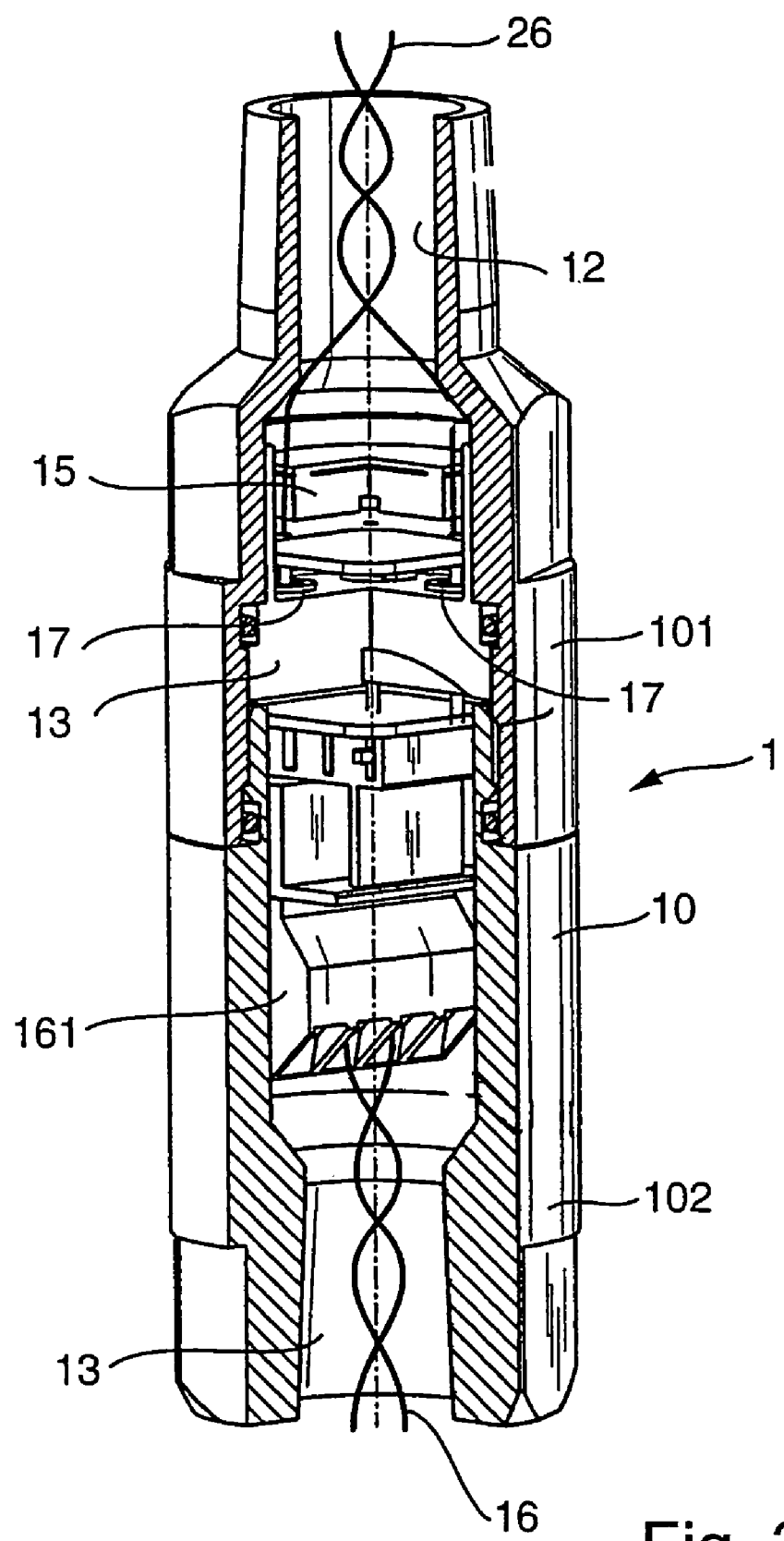
FIG. 2 a partially sectional, spatial representation of a safety module of the invention FIG. 3 an exploded drawing of the safety module of FIG. 2.
Figure 3:
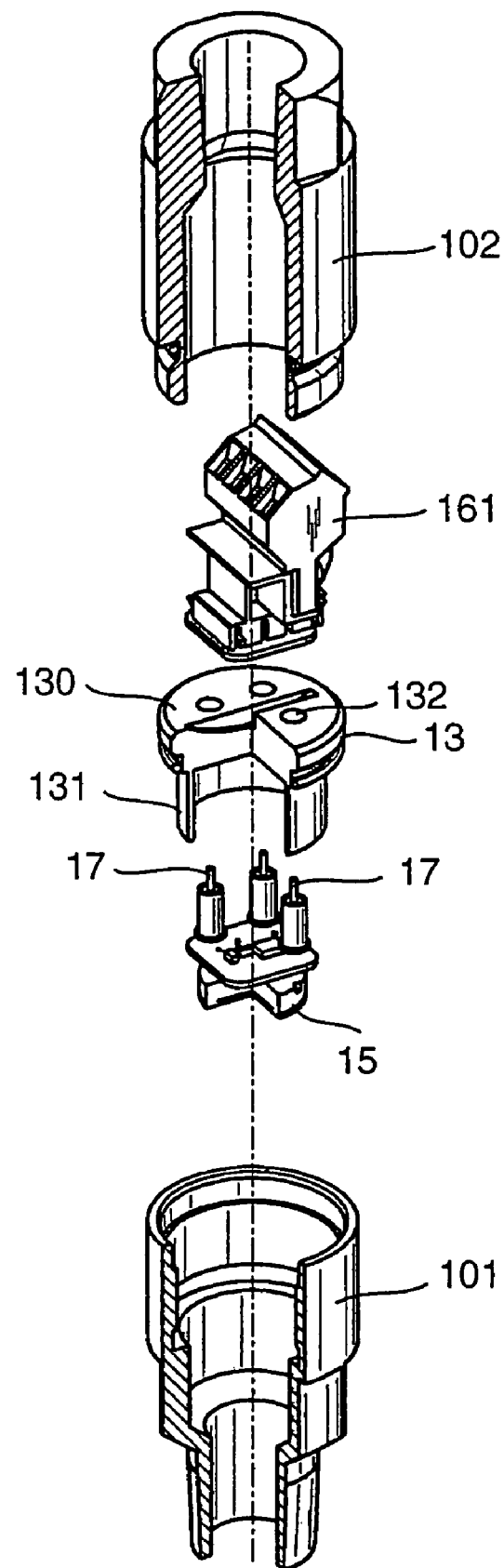
Figure 4:
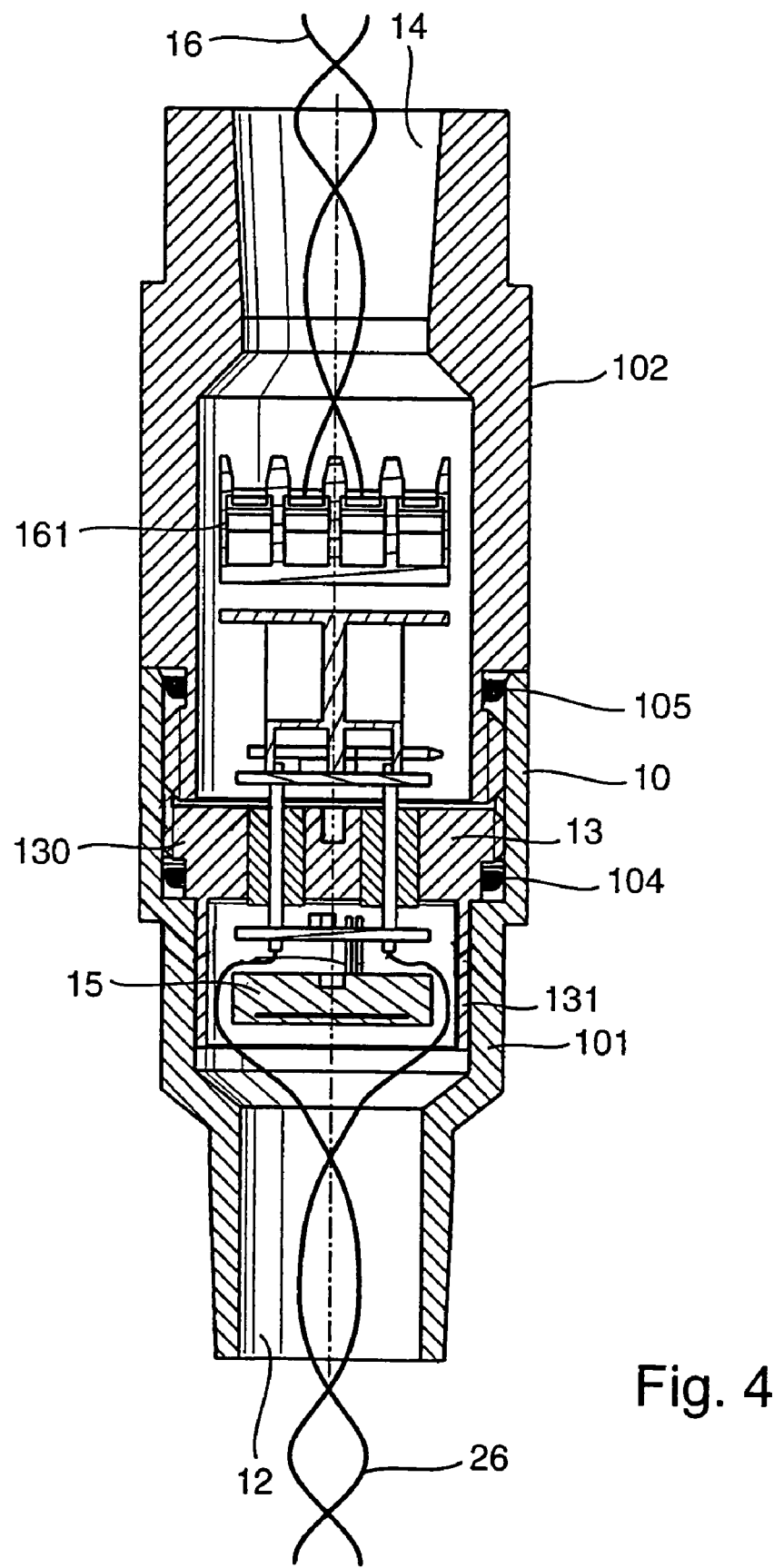
FIG. 4 a longitudinal section through the safety module of FIGS. 2 and 3.

Further details of the presently preferred form of the safety module will now be explained on the basis of FIGS. 2-4.

The module housing 10 has at least sectionally a cylindrical or frusto-conical shape. It is made of a material which can withstand pressure, preferably a metallic material, such as stainless steel, and includes a first housing-section 101 and a second housing-section 102, which can be screwed together pressure-tightly. For sealing, an O-ring 105 is provided between the housing-sections. In the first housing-section 101 the partition 13 is arranged. The partition 13 includes a wall-plate 130, in which traversing axial bores 132 are provided for the pressure-tight and gas-tight electrical bushings 17. From the wall-plate 130, a cylindrical sleeve 131 extends in an axial direction. The partition 13 is mounted with the sleeve 131 forward in the first housing-section 101, with a gap, dimensioned in such a way that it serves as a flame penetration barrier, being formed between the one lateral surface of the cylindrical sleeve 131 and the wall of the housing-section 101. The partition 13 can be, for example, screwed into or only set into the first housing-section 101, wherein the axial retention can then be accomplished, for example, using welding points, or tacks, or by support against the screwed-on second housing-section 102.

Between the lateral surface of the wall-plate 130 and the interior wall of the first housing-section 101, an O-ring 104 is provided, which is clamped radially and/or axially at abutment surfaces provided therefor.

The four electrical bushings 17 provided in this example, which in the assembly of the safety module are secured pressure-tightly in the bores through the wall-plate 130, are arranged on a circuit board, which bears the pressure switch 15. The connections of the pressure switch are connected with the electrical bushings such that, if a pressure limit value is exceeded, the electrical bushings 17, through which the signal current is led, are short-circuited. On the side of the wall-plate facing away from the pressure switch, a terminal block 161 is connected at the electrical bushings 17. The terminal block has connecting sockets for four wires, so that besides two-wire lines 16, four-wire lines can also be connected. Where required, resistors for limiting the current can be provided.

In an alternative embodiment, a plug connector is provided, which complies with the conventional connection technology as specified by Profibus PA or Foundation Fieldbus connections.

The invention claimed is:

1. A measuring arrangement, comprising:
   a measuring transmitter having: a sensor for registering a parameter of a medium, wherein the sensor issues a primary signal dependent on the parameter; a transmitter housing, which defines at least one chamber in its interior, and which has a first opening on the side facing the medium and a second opening, wherein a first section of a contamination path reaches from said first opening to said second opening, and extends through said at least one chamber; a first seal, which interrupts said first section of said contamination path; and an electronic circuit, which is arranged in said at least one chamber, wherein said electronic circuit processes the primary signal of said sensor and produces an output signal, which is issued over a first section of a signal path extending through said second opening;
   a safety module, which includes: a module housing, which defines at least one module chamber in its interior, and which has a first module opening on the side of said measuring transmitter and a second module opening, wherein a second section of the contamination path reaches from said first module opening at least as far as into said at least one module chamber; at least one second seal, which interrupts said second section of the contamination path; and a second section of the signal path; and
   a leak detector, wherein:
   said safety module is connectable with said measuring transmitter such that said second section of the contamination path connects to said first section of the contamination path; and said second section of the signal path connects to said first section of the signal path, in order to further conduct the output signal from said first section of the signal path; and
   said leak detector monitors a part of the contamination path arranged between said first seal and said second seal, in order to detect and to signal the failure of said first seal.

2. The measuring arrangement as claimed in claim 1, wherein:
   said leak detector changes the signal level of the output signal at the occurrence of a leak.

3. The measuring arrangement as claimed in claim 1, wherein:

said leak detector includes a capacitive sensor, a temperature sensor, a gas sensor, an electrochemical sensor, an amperometric sensor, a potentiometer sensor, a resonance-based sensor, a fill level sensor, a flow rate sensor, or a pressure sensor, respectively a pressure switch.

4. The measuring arrangement, as claimed in claim 1, wherein:

said signal path includes a feed current line on which the measurement is represented by means of a current level.

5. The measuring arrangement as claimed in claim 4, wherein:

said leak detector includes a switch, which in the case of a leak interrupts or short-circuits said feed current line.

6. The measuring arrangement as claimed in claim 1, wherein:

said leak detector includes an alarm circuit, which impresses on said signal path an alarm signal, which is distinguishable on the one hand from a normal measurement signal, and on the other hand from a short-circuit signal or an interrupted circuit.

7. The measuring arrangement as claimed in claim 1, wherein:

said module housing is connected preferably pressure-tightly with said transmitter housing, and said first module opening is in aligned communication with said second opening of said transmitter housing.

8. The measuring arrangement as claimed in claim 1, wherein:

said module housing is made of a metallic material or a synthetic material.

9. A safety module, for connection to a measuring transmitter having a transmitter housing, wherein the measuring transmitter includes an electrical measuring signal-output, for communicating a measurement signal over a signal path, which passes through an opening of the transmitter housing, wherein the safety module comprises:

a module housing, which defines at least one module chamber in its interior, and which has a first module opening on the side facing the measuring transmitter and a second module opening;

at least one seal, which interrupts a contamination path through said module housing;

a signal path section, which is connectable to the electrical measuring signal-output of the measuring transmitter, in order to conduct the measurement signal through the safety module, wherein the safety module is connectable with the measuring transmitter such that the first module opening communicates with the opening in the transmitter housing, so that the contamination path through said module housing communicates with an interior space of the transmitter housing; and a leak detector, which monitors a section of the contamination path located on the side of said at least one seal facing the measuring transmitter.

10. A measuring transmitter, having:

a sensor for registering a parameter of a medium, wherein said sensor issues a primary signal dependent on the parameter;

a transmitter housing, which defines at least one chamber in its interior, and which has a first opening on the side facing the medium and a second opening, wherein a contamination path reaches from said first opening to said second opening, and extends through said at least one chamber;

a first seal, in said transmitter housing, interrupting said contamination path;

a second seal in said transmitter housing, subsequent to said first seal, interrupting said contamination path;

an electronic circuit, which is arranged in said at least one chamber between said first seal and said second seal, wherein said electronic circuit processes the primary signal of said sensor and produces an output signal, which is issued over a signal path extending through said second opening; and a leak detector, which monitors a section of said contamination path between said first seal and said second seal, wherein, in the case of failure of said first seal, said leak detector changes the signal level of said output signal of said electronic circuit.

11. The measuring transmitter, as claimed in claim 10, wherein:

said signal path comprises a feed line, and the change of the signal level is accomplished by interrupting or short-circuiting said feed line, or by impressing an alarm signal on said feed line.

* * * * *